United States Patent

[11] 3,617,879

| [72] | Inventor | Robert E. F. Mugnier<br>Annecy (Haute-Savoie), France |
|---|---|---|
| [21] | Appl. No. | 859,998 |
| [22] | Filed | Sept. 22, 1969 |
| [45] | Patented | Nov. 2, 1971 |
| [73] | Assignee | International Standard Electric Corporation<br>New York, N.Y. |

[54] APPARATUS FOR AUTOMATICALLY INDICATING WHETHER OR NOT A TEST JOINT IN A CIRCUIT IS ABOVE OR BELOW A PREDETERMINED REFERENCE POTENTIAL
1 Claim, 3 Drawing Figs.

| [52] | U.S. Cl. | 324/57 R,<br>324/133, 340/248 |
|---|---|---|
| [51] | Int. Cl. | G01r 27/00 |
| [50] | Field of Search | 324/51, 57,<br>72.5, 73, 103, 123, 133, 143, 158; 340/248 A, 248 B, 248 C, 248 P |

[56] References Cited
UNITED STATES PATENTS

| 3,061,777 | 10/1962 | Bendell | 324/57 |
| 3,341,816 | 9/1967 | Davis et al. | 340/248 X |
| 3,351,927 | 11/1967 | Stinson | 340/248 |
| 3,525,939 | 8/1970 | Cartmell | 324/133 |

*Primary Examiner*—Edward E. Kubasiewicz
*Attorneys*—C. Cornell Remsen, Jr., Walter J. Baum, Paul W. Hemminger, Percy P. Lantzy and Thomas E. Kristofferson ABSTRACT: A testing method including the step of applying a rectangular wave to a logic circuit under test. Different points in the circuit under test are then probed and a signal lamp lights if the test point potential is sufficiently high or sufficiently low. The test point potential is compared with a reference. Duplicate indicators may be used to test for both high and low practically at the same time and without any operating switch. Alternatively, a double-pole, double-throw switch may be used with one indicator to test for either high or low. However, one or the other but not both low and high may be tested for in a single position of the switch.

PATENTED NOV 2 1971 3,617,879

Inventor
ROBERT E. F. MUGNIER

By
Attorney

APPARATUS FOR AUTOMATICALLY INDICATING WHETHER OR NOT A TEST JOINT IN A CIRCUIT IS ABOVE OR BELOW A PREDETERMINED REFERENCE POTENTIAL

BACKGROUND OF THE INVENTION

This invention relates to the logic circuit testing art and, more particularly, to a simple and inexpensive, yet highly reliable, method and apparatus for determining whether or not a logic circuit is operating properly.

In the past, certain methods and equipments have been used in logic circuit testing. However, the prior art invariably requires the use of expensive equipment, complicated and difficult to operate, which, in itself, is unreliable because of its exceeding complexity. For example, see U.S. Pat No. 3,219,927; 3,246,240; and 3,170,883.

SUMMARY OF THE INVENTION

In accordance with the present invention, the above-described and other disadvantages of the prior art are overcome by impressing a rectangular wave on a logic circuit under test, and producing an indication that the signal at a test point is of a predetermined magnitude.

In accordance with another feature of the invention, an indication is made when the test point signal exceeds or falls below the magnitude of a reference signal. For example, the test point potential is compared with reference point potential.

In accordance with another feature of the invention, the test point signal is compared to both a high and a low reference signal. For example, the test point potential may be compared to a high positive reference potential and a low positive reference potential. Using both of these tests for a binary logic circuit, these tests have been found highly reliable in establishing that a logic circuit under test is operating properly if, at some time during the test:

1 The test point potential is larger than the high positive reference potential, and 2. The test point potential is smaller than the low positive reference potential.

Moreover, simple and inexpensive apparatus may be employed to practice the present invention.

Notwithstanding the foregoing, it will be appreciated that the method of the invention must be repeated in order to check out more than one test point in a single logic circuit, and more than one test point often must be checked out to verify the proper operation of an entire logic circuit.

Still another feature of the invention resides in the use of switch means to permit the use of only one comparator and only one indicator for indicating both the test results aforementioned in succession.

A further feature of the invention includes a circuit to indicate both test results aforementioned without the need of the switch means or any time delay which is required to operate the switch means.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
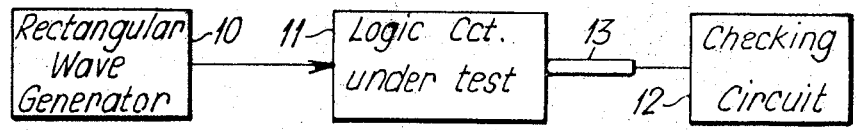
FIG. 1 is a block diagram of the apparatus of the invention.

In the drawings, in FIG. 1, a rectangular wave generator is indicated at 10. A logic circuit under test is indicated at 11. A checking circuit is indicated at 12. Generator 10 supplies a rectangular voltage wave input to circuit 11. Signals applied to a conductive probe 13 are impressed on the input to checking circuit 12. Probe 13 is manually positioned in contact with various test points in logic circuit 11.

Figure 2:
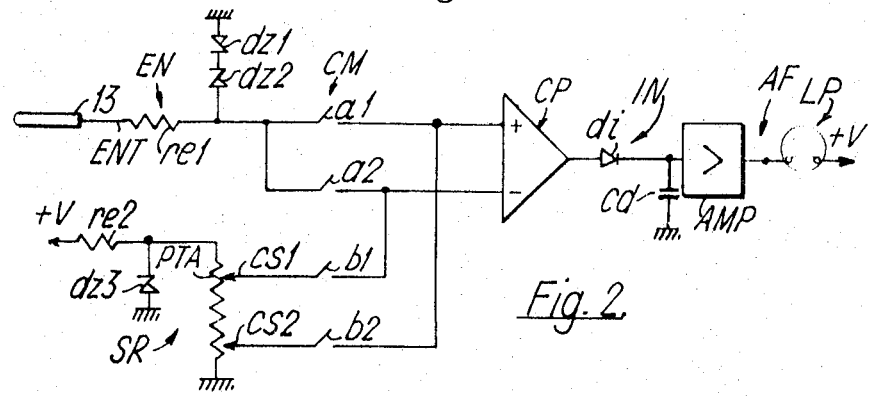
FIG. 2 is a schematic diagram of a checking circuit shown in FIG. 1.

One embodiment of checking circuit 12 is shown in FIG. 2. Probe 13 is connected to a input circuit EN via a lead ENT. Input circuit EN includes a resistor $re1$ connected from probe 13 to a switch $a1$. The mutual junction of resistor $re1$ and switch $a1$ has a connection with series-connected zener diodes $dz1$ and $dz2$ to ground. Switch $a1$ is adapted to connect the checking circuit input to the positive input of a comparator CP. Alternatively, the input to checking circuit 12 may be connected to the negative input of comparator CP by switch $a2$ connected from resistor $re1$.

A source of reference voltage is indicated at SR.

Source Sr includes a resistor $re2$ and potentiometer PTA connected in series from a point of positive potential to ground. A zener diode $dz3$ is connected in parallel with potentiometer PTA. Potentiometer PTA has wipers $cs1$ and $cs2$. Wiper $cs1$ is connected to the negative input of comparator CP by a switch $b1$. Wiper $cs2$ is connected to the positive input of comparator CP by a switch $b2$. An integrating circuit IN and a display circuit AF are connected in succession from comparator CP. Integrating circuit IN includes diode $di$ connected from comparator CP to amplifier AMP. A capacitor $cd$ is connected from the input to amplifier AMP to ground. The output of amplifier AMP is impressed upon a signal lamp LP.

In the operation of the checking circuit 12 shown in FIG. 2, switches $a1$ and $b1$ are closed when switches $a2$ and $b2$ are open. In this instance, lamp LP lights when the input to the checking circuit exceeds the potential of wiper $cs1$.

In the other mode of operation, switches $a1$ and $b1$ are open while switches $a2$ and $b2$ are closed. In this case, lamp LP is illuminated when the input to checking circuit 12 falls below the potential of potentiometer wiper $cs2$.

In accordance with the foregoing, the technician who is placing logic circuit 11 under test will connect generator 10, apply probe 13 to a test point, and wait for the illumination of lamp LP. The switches $a$ and $b$ are then reversed, and the technician will look for the illumination of lamp LP again. If lamp LP is illuminated during both modes of operation of the checking circuit 12 shown in FIG. 2, this will mean that the test points will have had a potential at some time more positive than that of wiper $cs1$, and less positive than that of wiper $cs2$. As stated previously, these indications provide a highly reliable test of particular test points. If an appropriate number of test points of circuit 11 are made, the circuit 11 will almost invariably be found to be operating properly.

Switches $a1$, $a2$, $b1$, and $b2$ may include component parts of switching means CM. Note will be taken that by inspection, switching means CM may in fact be simply a double-pole, double-throw switch.

Figure 3:
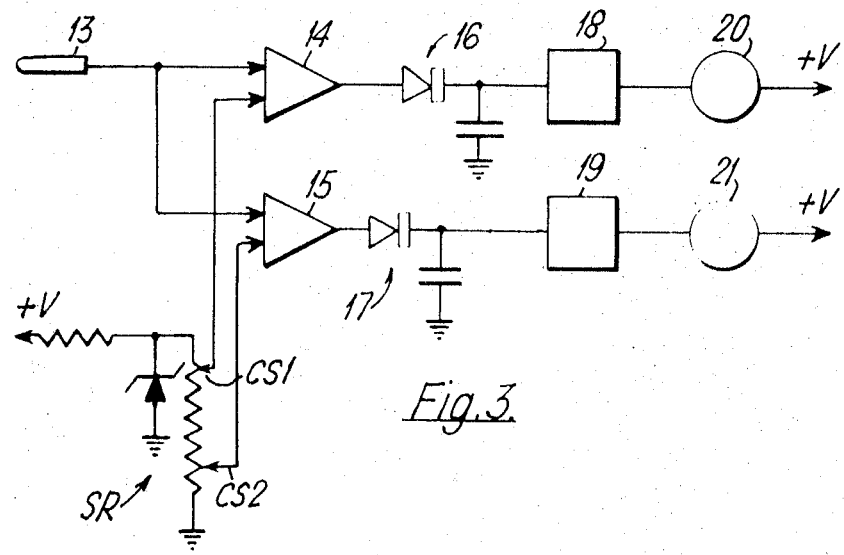
FIG. 3 is a schematic diagram of an alternative checking circuit.

An alternative embodiment of the checking circuit 12 is shown in FIG. 3. The checking circuit 12 shown in FIG. 3 includes two comparators 14, and 15, two integrating circuits 16 and 17, two amplifiers 18 and 19, and two lamps 20 and 21. All of the structures connected from the output of comparator 14 are thus identical to those connected from the output of comparator CP in FIG. 2. The same is true of all of the structures connected from the output of comparator 15. Source SR is again shown in FIG. 3 including potentiometer wipers $cs1$ and $cs2$.

In the operation of the checking circuit 12 shown in FIG. 3, the probe 13 is always connected to comparators 14 and 15. Comparator 14 is connected to wiper $cs1$, and comparator 15 is connected to wiper $cs2$. The potential of probe 13 is, thus, compared with the potentials of both of the wipers $cs1$ and $cs2$ simultaneously. The need for switching means CM is thus avoided. Visual display on lamps 20 and 21 is thus possible. However, the embodiment of FIG. 2 has the advantage that less equipment is needed. Note will be taken that in the operation of checking circuit 12 shown in FIG. 3, lamp 20 will light when the potential of probe 13 is more positive than that of wiper $cs1$. On the other hand, lamp 21 will light when the potential of probe 13 is less than that of wiper $cs2$.

From the foregoing, it will be appreciated that the method and apparatus of the present invention are extremely simple and highly reliable.

What is claimed is:

1. In a logic circuit testing apparatus, the combination comprising: means for impressing a rectangular wave on the input of the circuit under test; a checking circuit having an input; movable conductor means for connecting said checking circuit input to any one of a plurality of different conductors in the circuit under test, said checking circuit including a first comparator having first and second inputs, said first input being connected from said conductor means; a reference voltage source connected to said second input; means to indicate the output of said comparator; said rectangular wave being a voltage wave having equal periods of high and low amplitudes, said conductor means including a movable conductive probe having a bare conductive end adapted to be placed in contact with various different conductors in the circuit under test, said checking circuit including a resistor connected from said probe to one end of a series circuit including two zener diodes poled in opposite directions, the other end of said series circuit being grounded, said reference voltage source including a source of potential having a grounded negative terminal, a resistor connected in series with a potentiometer from the positive terminal to ground, a zener diode connected in parallel with said potentiometer and having its anode grounded, said potentiometer having first and second wipers, said first wiper being located at a higher potential than said second wiper, a double-pole, double-throw switch, said switch being adapted to connect said first wiper to said second comparator input and to connect said one end of said series circuit to said first comparator input substantially simultaneously while disconnecting said second wiper from said first comparator input and disconnecting said one end of said series circuit from said second comparator input, said switch, conversely, being adapted to connect said second wiper to said first comparator input and to connect said one end of said series circuit to said second comparator input substantially simultaneously while disconnecting said first wiper from said second comparator input and disconnecting said one end of said series circuit from said first comparator input, an amplifier having an input and an output, a diode connected from the output of said comparator to said amplifier input, a capacitor connected from said amplifier input to ground, and a lamp connected from the output of said amplifier, said diode being poled in a direction away from said amplifier.

* * * * *